United States Patent
Ikeda (10) Patent No.: US 7,542,594 B2
(45) Date of Patent: Jun. 2, 2009

(54) IMAGE CONSTRUCTION METHOD, FINGERPRINT IMAGE CONSTRUCTION APPARATUS, AND PROGRAM

(75) Inventor: Munehiro Ikeda, Kawasaki (JP)

(73) Assignee: NEC Infrontia Corporation, Kawasaki-Shi (JP)

( * ) Notice: Subject to any disclaimer, the term of this patent is extended or adjusted under 35 U.S.C. 154(b) by 673 days.

(21) Appl. No.: 11/236,614

(22) Filed: Sep. 28, 2005

(65) Prior Publication Data

US 2006/0067565 A1 Mar. 30, 2006

(30) Foreign Application Priority Data

Sep. 30, 2004 (JP) ............... 2004-287121

(51) Int. Cl.
*G06K 9/00* (2006.01)
*G06K 9/36* (2006.01)

(52) U.S. Cl. ..................... 382/124; 382/284

(58) Field of Classification Search ......... 382/115–125, 382/151, 190, 209, 214, 284, 298–300; 235/380; 340/5.1, 5.92
See application file for complete search history.

(56) References Cited

U.S. PATENT DOCUMENTS

| | | | |
|---|---|---|---|
| 5,495,537 A | | 2/1996 | Bedrosian et al. |
| 6,289,114 B1 * | | 9/2001 | Mainguet ............... 382/124 |
| 6,459,804 B2 * | | 10/2002 | Mainguet ............... 382/124 |
| 6,546,122 B1 * | | 4/2003 | Russo ................... 382/125 |
| 7,110,579 B2 * | | 9/2006 | Hashimoto ............. 382/124 |
| 7,197,168 B2 * | | 3/2007 | Russo ................... 382/125 |
| 7,200,250 B2 * | | 4/2007 | Chou .................... 382/124 |
| 7,412,083 B2 * | | 8/2008 | Takahashi .............. 382/124 |
| 2002/0164056 A1 * | | 11/2002 | Funada .................. 382/124 |
| 2003/0026458 A1 | | 2/2003 | Nahum |
| 2003/0123714 A1 * | | 7/2003 | O'Gorman et al. ...... 382/124 |

FOREIGN PATENT DOCUMENTS

| | | |
|---|---|---|
| JP | 07-306941 | 11/1995 |
| JP | 2002-123823 | 4/2002 |
| JP | 2003-208620 | 7/2003 |
| JP | 2003-248820 | 9/2003 |
| JP | 2003-248828 | 9/2003 |
| JP | 2004-110438 | 4/2004 |

* cited by examiner

*Primary Examiner*—Jingge Wu
*Assistant Examiner*—Andrae S Allison
(74) *Attorney, Agent, or Firm*—Young & Thompson

(57) ABSTRACT

In construction processing of a fingerprint partial image, distortion occurs in the general image due to accumulation of coordinate errors at image joining positions. While a latest partial image read by a sweep type fingerprint sensor is being displaced relative to an already acquired partial image, a displacement quantity at each displacement position is found. By interpolation computation using the found values, a first vector component indicating a movement quantity of the latest partial image in the slide direction, and first and second candidates for a second vector component indicating a movement quantity in a direction perpendicular to the slide direction are calculated as values each having a resolution higher than the pixel pitch. The latest partial image is disposed so as to be joined to the already acquired partial image on the basis of a movement quantity vector including the first and second vector components.

15 Claims, 7 Drawing Sheets

IMAGE CONSTRUCTION METHOD, FINGERPRINT IMAGE CONSTRUCTION APPARATUS, AND PROGRAM

BACKGROUND OF THE INVENTION

1. Field of the Invention

The present invention relates to a technique for generating a fingerprint image to be used in fingerprint collation processing. In particular, the present invention relates to a technique for using a sensor mechanism to read a series of partial images representing a fingerprint from a finger which conducts slide operation and constructing a general image of the fingerprint from the series of partial images.

2. Description of the Related Art

As a kind of a conventional sensor mechanism for reading a fingerprint image, there is the so-called sweep type fingerprint sensor. The sweep type fingerprint sensor has a sensor surface that is substantially the same in lateral width as a finger and that is shorter in longitudinal length than the whole fingerprint. The sweep type fingerprint sensor is a mechanism which continuously acquires partial images of a fingerprint from a finger which moves in substantially one direction. When constructing a general image of a fingerprint from partial images acquired by the sweep type fingerprint sensor, those partial images are joined on the basis of a movement quantity vector of an input image relative to a preceding image.

In calculating the movement quantity vector, an input image is gradually displaced with an interval corresponding to one pixel, in a predetermined range of the preceding image. The sum total of differences between pixels or lines in mutually corresponding partial images is obtained every displacement as a difference quantity between both images. And a movement quantity vector is calculated on the basis of a displacement at the time when the difference quantity becomes the minimum.

As regards the technique for constructing a general image from partial images of a fingerprint, for example, there are techniques described in JP-A-2003-208620 and JP-A-2003-248820. The technique described in JP-A-2003-208620 includes the steps of setting a region in an input image expected to overlap a preceding image as a noted region, detecting a region that most resembles the noted region from the preceding image, and combining both images so as to make the detected resembling region and the noted region in the input image coincide with each other. The technique described in JP-A-2003-248820 includes the steps of searching for a common region in which feature shapes in two partial images, i.e., a preceding image and a subsequent image, obtaining a movement quantity required when superposing both images in the common region, and joining the two partial images on the basis of the movement quantity.

In a technique for searching for a movement quantity vector which prescribes the disposition of an input image with respect to a preceding image with a pixel pitch, such as the above-described conventional technique, an error is caused by the fact that the actual movement quantity vector component is not necessarily in size an integer times the pixel pitch. Since the errors are accumulated each time joining processing of partial images is conducted, a problem of distortion occurrence in the finally constructed general image is caused. The image distortion caused by the error is remarkable especially in a direction perpendicular to the slide direction of the finger. Its cause is that the movement velocity component of the finger in the perpendicular direction is very small as compared with that in the slide direction. If the error as described above is caused, therefore, distortion of the general image appears remarkably in the perpendicular direction as an influence of the error.

If collation processing is conducted using a fingerprint image having remarkable image distortion, it becomes difficult to obtain a proper collation result. Because the fingerprint image having remarkable image distortion is hard to coincide with a previously registered image, even if the image is a clear image having an area sufficient for the collation. As means for reducing the error, it is considerable to raise the resolution by making the pixel pitch of the fingerprint sensor small. If the means is used, however, the quantity of image information to be processed increases, and consequently the processing capability of the processor and memory capacity capable of coping with the increase become necessary, resulting in a disadvantage of an increased apparatus cost.

SUMMARY OF THE INVENTION

In order to solve the problems, the present invention has been achieved. An object of the present invention is to provide a technique for making it harder for distortion in the general image of the fingerprint to occur, regardless of the size of the pixel pitch in the fingerprint sensor.

The present invention provides an image construction method used in an apparatus including a sensor mechanism to read a series of partial images representing a fingerprint from a finger which conducts a slide operation, the image construction method including the steps of successively storing partial images read by the sensor mechanism, causing a displacement of a latest partial image in the successively stored partial images relative to an already acquired partial image with a pixel pitch of the sensor mechanism, and obtaining a difference quantity between the latest partial image and the already acquired partial image every displacement; conducting interpolation computation based on basis coordinates corresponding to a minimum difference quantity among the obtained difference quantities, first reference coordinates adjacent to the basis coordinates in a slide direction of a finger, and difference quantities obtained at the first reference coordinates and the basis coordinates, and thereby obtaining a first vector component indicating a movement quantity of the latest partial image in the slide direction as a value having a resolution higher than the pixel pitch; conducting interpolation computation based on the basis coordinates, second reference coordinates adjacent to the basis coordinates in a direction perpendicular to the slide direction, and difference quantities obtained at the second reference coordinates and the basis coordinates, and thereby obtaining a first candidate for a second vector component indicating a movement quantity of the latest partial image in the perpendicular direction as a value having a resolution higher than the pixel pitch; conducting interpolation computation based on the first reference coordinates, and third reference coordinates adjacent to the first reference coordinates in the perpendicular direction, and difference quantities obtained at the third reference coordinates and the first reference coordinates, and thereby obtaining a second candidate for the second vector component as a value having a resolution higher than the pixel pitch; conducting weighted average computation based on the first vector component on the first and second candidates for the second vector component, and thereby determining the second vector component; and disposing the latest partial image relative to the already acquired partial image on the basis of a movement quantity vector including the first and second vector components.

The present invention provides a fingerprint image construction apparatus including a sensor mechanism for reading a series of partial images representing a fingerprint from a finger which conducts a slide operation, a memory mechanism for successively storing the series of partial images read by the sensor mechanism, and a control mechanism for conducting construction processing on the series of partial images stored by the memory mechanism, wherein the control mechanism includes: a difference computation unit for causing a displacement of a latest partial image in the partial images successively stored by the memory mechanism relative to an already acquired partial image with a pixel pitch of the sensor mechanism, and obtaining a difference quantity between the latest partial image and the already acquired partial image every displacement; a movement quantity vector calculation unit for conducting interpolation computation based on basis coordinates corresponding to a minimum difference quantity among difference quantities obtained by the difference computation unit, first reference coordinates adjacent to the basis coordinates in a slide direction of a finger, and difference quantities obtained at the first reference coordinates and the basis coordinates, and thereby obtaining a first vector component indicating a movement quantity of the latest partial image in the slide direction as a value having a resolution higher than the pixel pitch, conducting interpolation computation based on the basis coordinates, second reference coordinates adjacent to the basis coordinates in a direction perpendicular to the slide direction, and difference quantities obtained at the second reference coordinates and the basis coordinates, and thereby obtaining a first candidate for a second vector component indicating a movement quantity of the latest partial image in the perpendicular direction as a value having a resolution higher than the pixel pitch, conducting interpolation computation based on the first reference coordinates, and third reference coordinates adjacent to the first reference coordinates in the perpendicular direction, and difference quantities obtained at the third reference coordinates and the first reference coordinates, and thereby obtaining a second candidate for the second vector component as a value having a resolution higher than the pixel pitch, conducting weighted average computation based on the first vector component on the first and second candidates for the second vector component, and thereby determining the second vector component; a disposition coordinate computation unit for obtaining disposition coordinates of the latest partial image relative to the already acquired partial image on the basis of a movement quantity vector including the first and second vector components; and an image disposition unit for disposing the latest partial image in the memory mechanism on the basis of the disposition coordinates.

According to the present invention, the latest partial image is disposed on the basis of the movement quantity vector obtained as a value having a resolution higher than the pixel pitch. Therefore, it is possible to make distortion hard to occur in the general image obtained after the construction processing, regardless of whether the resolution of the sweep type fingerprint sensor is high or low. As a result, it becomes possible to execute the authentication processing using the fingerprint properly. In addition, even if a sweep type fingerprint sensor having a comparatively low resolution is used, it functions effectively. As a result, it is possible to reduce the size and power of the whole apparatus.

DESCRIPTION OF THE PREFERRED EMBODIMENTS

Figure 1:
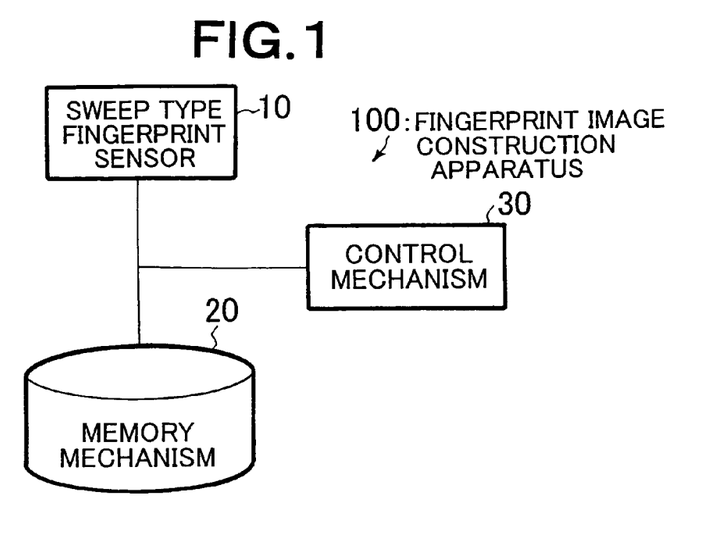
FIG. 1 is a block diagram showing a general configuration of a fingerprint image construction apparatus according to an embodiment of the present invention.

Hereafter, embodiments of the present invention will be described in detail with reference to the drawings. FIG. 1 is a block diagram showing a configuration of a fingerprint image construction apparatus according to an embodiment of the present invention. A fingerprint image construction apparatus 100 according to an embodiment includes a sweep type fingerprint sensor 10 which serves as a sensor mechanism for reading a series of partial images that represent a fingerprint, a memory mechanism 20 for storing partial images read by the sensor 10, a control mechanism 30 for conducting construction processing to construct a general image from a series of partial images stored by the memory mechanism 20.

Figure 2:
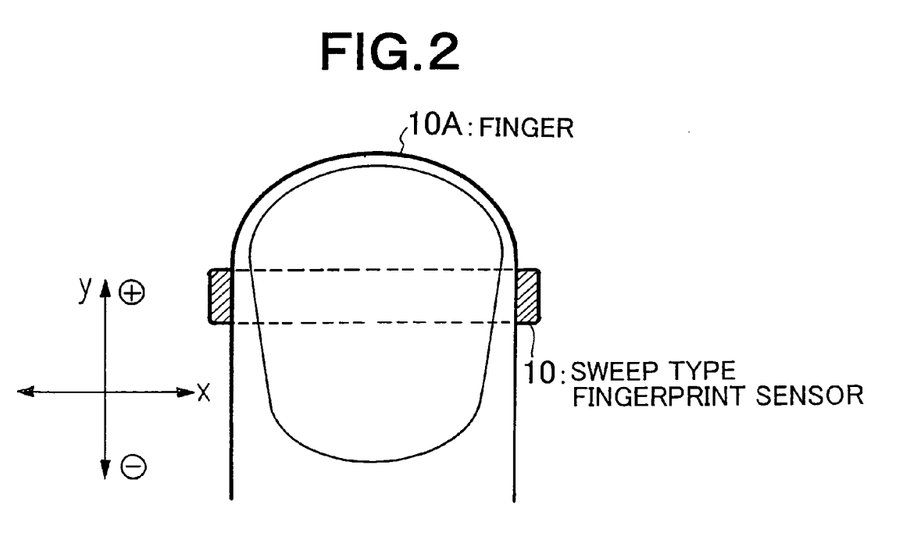
FIG. 2 is a diagram showing a sweep type fingerprint sensor according to an embodiment.

A general view of the sweep type fingerprint sensor 10 is shown in FIG. 2. The sweep type fingerprint sensor 10 has a sensor surface that is substantially the same in width in an illustrated x direction as the finger 10A and that is shorter in length in a y direction than the length of the whole fingerprint of the finger 10A, i.e., the length between the first joint and a fingertip. From the finger 10A which slides on this surface substantially in the y direction, partial images of the fingerprint are read consecutively by the sweep type fingerprint sensor 10.

Figure 3:
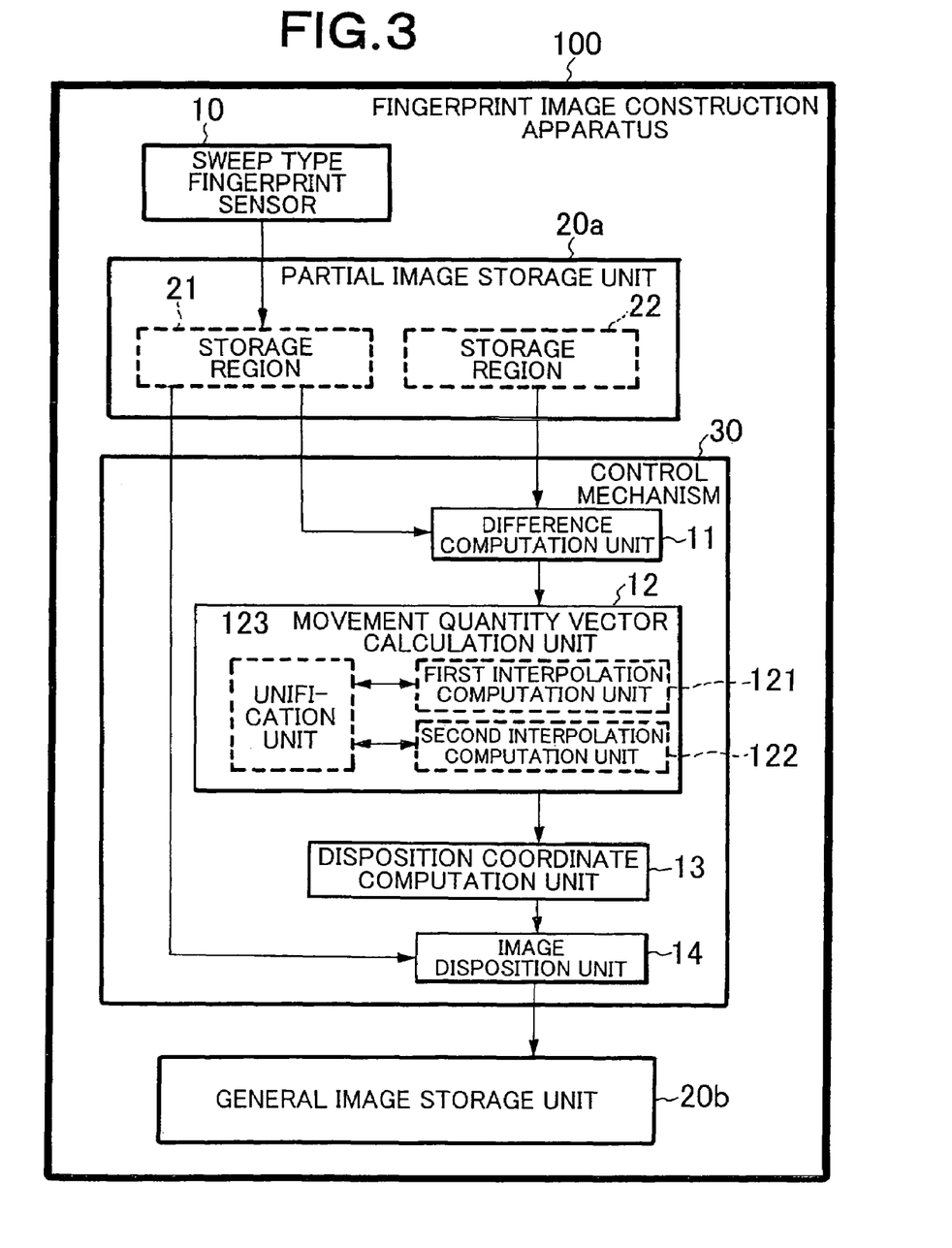
FIG. 3 is a block diagram showing a functional configuration of a fingerprint image construction apparatus according to an embodiment.

FIG. 3 shows functional configuration blocks of the fingerprint image construction apparatus 100. A partial image storage unit 20a and a general image storage unit 20b shown in FIG. 3 are storage regions assigned to the memory mechanism 20. The partial image storage unit 20a stores partial images successively input from the sweep type fingerprint sensor 10. The general image storage unit 20b stores a general image of the fingerprint formed via construction processing conducted in the control mechanism 30 described later.

The partial image storage unit 20a has a capacity capable of storing a plurality of partial images. In the illustrated example, the partial image storage unit 20a includes a storage region 21 and a storage region 22 for storing two partial images. The latest partial image input from the sweep type fingerprint sensor 10 is stored in the storage region 22. An already acquired partial image corresponding to a preceding image for the latest partial image, i.e., the second latest partial image at the current time point is stored in the storage region 21.

Figure 4:
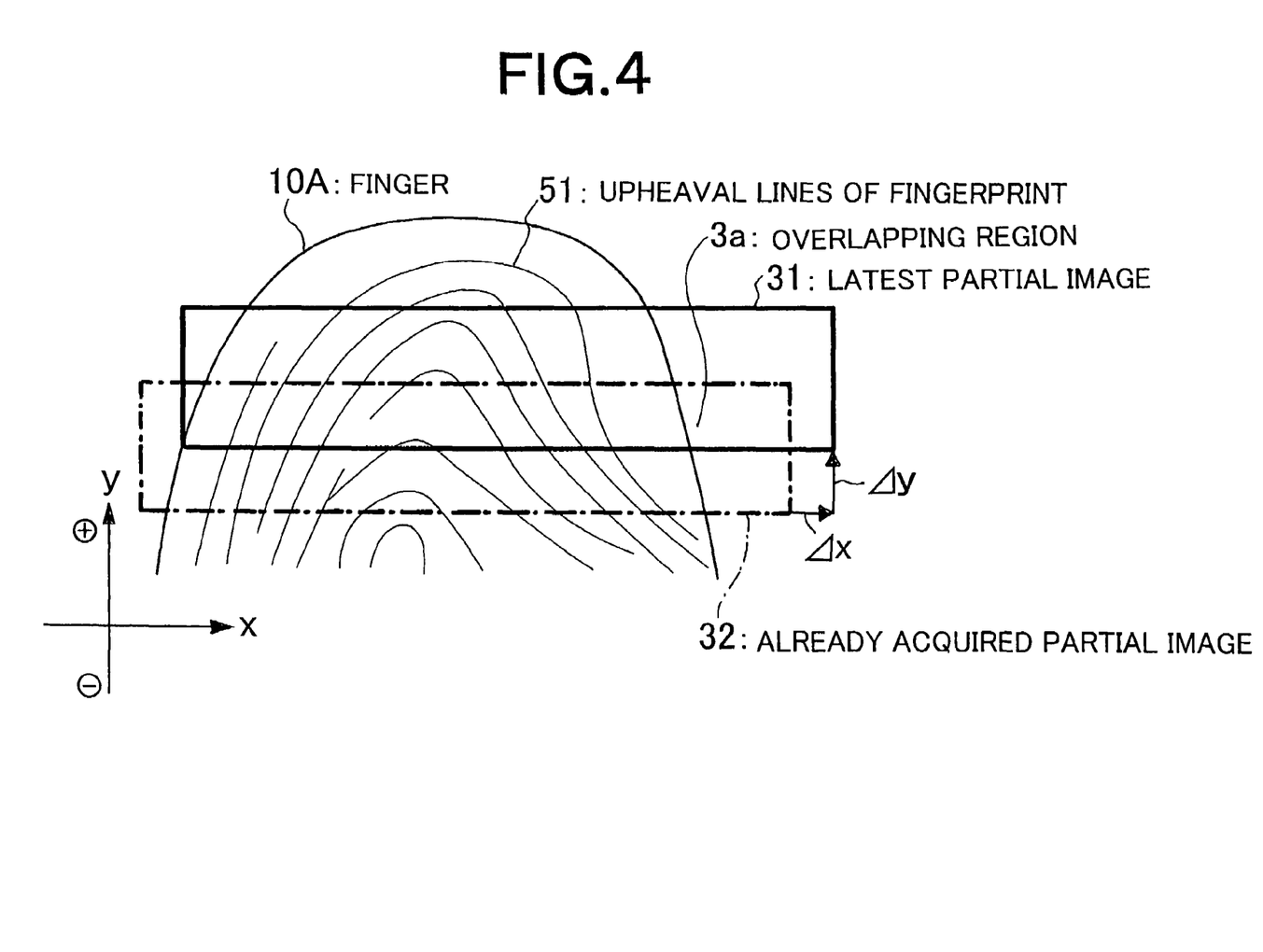
FIG. 4 is a diagram showing partial images according to an embodiment.

An example of partial images stored in the storage region 21 and the storage region 22 is shown in FIG. 4. Curves shown in the illustrated finger 10A represent upheaval lines 51 of the fingerprint. At each read timing of the sweep type fingerprint sensor 10, one of rectangular partial images indicated by a solid line or a dotted line is input to the memory mechanism 20. In the example shown in FIG. 4, a rectangle indicated by a dotted line represents an already acquired partial image 32 stored in the storage region 21. A latest partial image 31 read in the wake of the already acquired partial image 32 and stored in the storage region 22 is indicated by a solid line rectangle. By the way, the state shown in FIG. 4 is a state in which a difference quantity in an overlapping region 3a between the latest partial image 31 and the already acquired partial image 32 is zero, i.e., a state in which both images are superposed without any error.

A position relation between the latest partial image 31 and the already acquired partial image 32 shown in FIG. 4 represents that a relative position of the finger 10A with respect to the sweep type fingerprint sensor 10 is displaced. Specifically, the position relation between the images 31 and 32 indicates that the finger 10A shown in FIG. 2 has slid in a minus (−) direction of the y-axis with respect to the sweep type fingerprint sensor 10.

The functional configuration of the control mechanism 30 shown in FIG. 3 takes charges of construction processing for superposing the latest partial image stored in the storage region 22 on the already acquired partial image stored in the storage region 21. A difference computation unit 11 calculates a difference quantity at each displacement while gradually displacing a partial image serving as the basis for superposition, i.e., the already acquired partial image stored in the storage region 21 and the latest partial image stored in the storage region 22 which is a partial image of a superposition subject, in a preset range, and outputs a combination of the displacement quantity obtained as a result of the calculation and the displacement position.

A movement quantity vector calculation unit 12 includes a first interpolation computation unit 121, a second interpolation computation unit 122 and a unification unit 123 therein. According to a procedure described later, the movement quantity vector calculation unit 12 obtains vector components in the slide direction of the finger and its perpendicular direction. A disposition coordinate computation unit 13 calculates disposition coordinates that the latest partial image stored in the partial image storage unit 20a should take in the general image storage unit 20b on the basis of the value of the vector component obtained by the movement quantity vector calculation unit 12 and disposition coordinates of the already acquired partial image recorded the last time. An image disposition unit 14 disposes the latest partial image stored in the partial image storage unit 20a, in the general image storage unit 26b on the basis of a result of the calculation conducted by the disposition coordinate computation unit 13.

An operation procedure in the fingerprint image construction apparatus 100 will now be described with reference to a flow chart shown in FIG. 5. The finger 10A is slid with respect to the sweep type fingerprint sensor 10. Each time a partial image is input (step S1), the memory mechanism 20 stores the latest partial image 31 as shown in FIG. 4 in the storage region 22 (step S2). At this time, the already acquired partial image 32 which is the preceding image for the latest partial image 31 is stored in the other storage region 21. Hereafter, a procedure for superposing the latest partial image 31 on the already acquired partial image 32 shown in FIG. 4 will be described as an example of the construction processing conducted by the control mechanism 30.

The difference computation unit 11 calculates a difference quantity between both images at each displacement position while gradually displacing the latest partial image 31 with a pixel pitch relative to the already acquired partial image 32 on the basis of an orthogonal coordinate system having integer coordinates arranged with pixel pitches (step S3). At that time, the latest partial image 31 is displaced so as to form an overlapping portion of both images as represented by the overlapping region 3a shown in FIG. 4. As for the method for calculating the difference quantity, a conventionally known method for calculating the difference quantity by using gray level distribution of pixel values included in the partial images, vector distribution of fingerprint upheaval lines, or feature points such as end points and branch points of fingerprint upheaval lines is used.

If, for example, the gray level distribution of pixel values in the partial images is used as the difference quantity calculation method, an image difference quantity D is defined by the following equation (1a).

$$D(i, j) = \sum_y \sum_x \{P_1(x-i, y-j) - P_2(x, y)\} \quad (1a)$$

$P_1(x, y)$ and $P_2(x, y)$ in the equation (1a) are gray level data concerning a pixel having coordinates (x, y) in the latest partial image 31 and the already acquired partial image 32. Therefore, the image difference quantity $D(i, j)$ defined by the equation (1a) indicates a value obtained by displacing the latest partial image 31 relative to the already acquired partial image 32 by (i, j) pixels, superposing the latest partial image 31 on the already acquired partial image 32, and adding up differences of mutually corresponding pixel values in the overlapping region.

As for the definition of the image difference quantity D, equation (1b) or (1c) may also be used instead of the equation (1a). In the present invention, any of these definitions may be used, or a different definition may also be used. In any definition, each of i and j assumes an integer value.

$$D(i, j) = \sum_y \sum_x \{P_1(x-i, y-j) - P_2(x, y)\}^2 \quad (1b)$$

$$D(i, j) = \sum_y \sum_x |P_1(x-i, y-j) - P_2(x, y)| \quad (1c)$$

The difference computation unit 11 calculates the image difference quantity D at each retrieval point (i, j) in a preset displacement range, and outputs respective calculation results to the movement quantity vector calculation unit 12.

The movement quantity vector calculation unit 12 calculates a movement quantity vector which represents a relative position relation of the latest partial image 31 relative to the already acquired partial image 32, on the basis of the image difference quantity D(i, j) output by the difference computation unit 11. For example, with reference to FIG. 4, the movement quantity vector of the latest partial image 31 relative to the already acquired partial image 32 is represented by (ΔX, Δy). As described earlier, the overlapping region 3a shown in FIG. 4 becomes a region that is common to the latest partial image 31 and the already acquired partial image 32, i.e., a region in which image data become the same. Therefore, the value of the image difference quantity D(Δx, Δy) in the overlapping region 3a becomes zero.

By the way, since values of Δx and Δy, which are components of the movement quantity vector, correspond to the movement of the finger on the sweep type fingerprint sensor 10, those values are not necessarily integer values. In other words, as a matter of fact, there is a possibility that each of Δx and Δy assumes a value between two coordinates in a coordinate system based on the pixel pitch. Taking this into consideration, the movement quantity vector calculation unit 12 in the present embodiment calculates each of the components Δx and Δy of the moving quantity vector as a value having a resolution that is higher than the pixel pitch by using interpolation computation. Hereafter, its procedure will be described in detail.

The unification unit 123 first calculates a movement quantity vector component $\Delta y_1$ in the y direction, which is the main movement direction of the finger. The vector component $\Delta y_1$ corresponds to a first vector component in the present invention. In order to calculate $\Delta y_1$, the unification unit 123 extracts a minimum image difference quantity D(i', j') and a retrieval point (i', j'), which is a displacement position where the difference quantity D is obtained, from among combinations of the displacement position and the image difference quantity D output from the difference computation unit 11. The retrieval point (i', j') corresponds to the basis coordinates in the present invention.

In addition, the unification unit 123 extracts combinations of two retrieval points (i', j'+1) and (i', j'−1) adjacent to the extracted retrieval point (i', j') in the y direction and difference quantities D at the two retrieval points, and outputs values of the three sets to the first interpolation computation unit 121. The two retrieval points (i', j'+1) and (i', j'−1) adjacent to the retrieval point (i', j') serving as the basis coordinates correspond to the first reference coordinates in the present invention.

Figure 6:
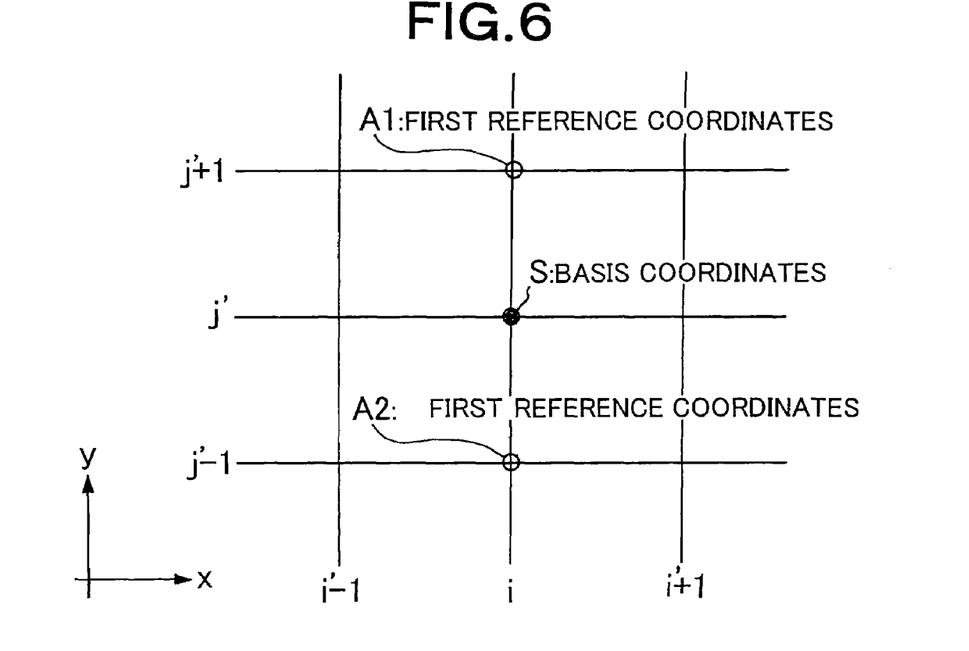
FIG. 6 is a diagram showing a calculation procedure of a movement quantity vector component in a y direction in an embodiment.

Disposition of the retrieval points is shown in FIG. 6. FIG. 6 is a diagram showing integer coordinates in a coordinate system based on the pixel pitch by intersections of a matrix. As shown in FIG. 6, two retrieval points A1(i', j'+1) and A2(i', j'−1) each serving as the first reference coordinates are coordinates that have a retrieval point S(i', j') serving as basis coordinates between them in the y direction. The first interpolation computation unit 121 conducts interpolation computation by using the above-described three retrieval points S, A1 and A2 and their respective difference quantities D, and calculates the movement quantity vector (Δx, Δy) as values each having a resolution higher than the pixel pitch.

The interpolation computation conducted by the first interpolation computation unit 121 will now be described with reference to FIG. 7. The illustrated abscissa indicates a coordinate value that the vector component Δx or Δy can assume, and the ordinate indicates an image difference quantity D at each coordinate value. Values of the image difference quantity D at three points, i.e., a retrieval point (n) that becomes the vector component Δx or Δy at the time when the image difference quantity D becomes the minimum, i.e., the x coordinate or y coordinate of the basis coordinates, and retrieval points (n−1) and (n+1) are indicated by circle marks. By the way, n is an integer coordinate value i or j in the pixel pitch coordinate system.

The image difference quantity D(n) at the retrieval point (n) assumes the minimum value in the pixel pitch coordinate system. Therefore, it is self-evident that a true movement quantity Δ, i.e., a movement quantity represented by a value having a resolution higher than the pixel pitch is the nearest the retrieval point (n) among the three points. In addition, in the example shown in FIG. 7, the magnitude relation in image difference quantity D between the retrieval points (n−1) and (n+1) having the retrieval point (n) between them is "D(n−1)>D(n+1)." Therefore, the true movement quantity Δ becomes a value in the range of "n<Δ<n+0.5."

For obtaining the true movement quantity Δ which satisfies the condition, various methods are conceivable. Here, however, an interpolation method using a straight line will now be described. According to this method, a straight line $L_-$ passing through D(n−1) and D(n) is drawn as shown in FIG. 7. Another straight line $L_+$ having a slope obtained by inverting a sign in the slope of the straight line $L_-$ and passing through D(n+1) is drawn. A coordinate value at an intersection of the straight lines $L_-$ and $L_+$ is calculated as the true movement quantity Δ in the y direction. Its calculation is represented by the following equation (2a).

$$\Delta = n + \frac{1}{2} \frac{D(n-1) - D(n+1)}{D(n-1) - D(n)} \quad (2a)$$

If the magnitude relation in image difference quantity D between the retrieval points (n−1) and (n+1) is "D(n−1)<D(n+1)" in contrast with the above-described example, the true movement quantity Δ is obtained using the following equation (2b).

$$\Delta = n + \frac{1}{2} \frac{D(n-1) - D(n+1)}{D(n+1) - D(n)} \quad (2b)$$

As for the interpolation computation for obtaining the real movement quantity Δ, not only the equations, but also another method may also be used. For example, in another conceivable method, a coordinate value at which a quadratic curve passing through the above-described three points assumes an extreme value is regarded as the true movement quantity Δ. If a function form of the image difference quantity D is previously known, it is also possible to find a function of the image difference quantity D passing through the three points by using the least square method and regard a coordinate value at which the found function assumes an extreme value as the true movement quantity Δ.

When finding the value of the true movement quantity Δ using the above-described methods, for example, the true movement quantity Δ may be represented by a real number value in order to represent the true movement quantity Δ by a value having a resolution higher than the pixel pitch. Furthermore, instead of this, it is also conceivable to form an expanded coordinate system having coordinates of integer values by dividing the integer coordinate system based on the pixel pitch by an integer m of at least 2, and represent the true movement quantity Δ by integer coordinate values in the expanded coordinate system.

In the case where integer coordinate values in the expanded coordinate system are used, subsequent computation processing can be made integer computation based on the expanded coordinate system, resulting in a merit that processing can be conducted at a higher rate as compared with the computation which handles real numbers. If processing of this integer computation is conducted in an ordinary computer in which computation is based on binary numbers, the highest rate processing is anticipated by setting a division number m equal to a number that is power of 2.

As the pitch of the expanded coordinate system, i.e., a pitch (P/m) obtained by dividing the pixel pitch P by the division number m is made smaller, the influence of the rounding error on the computation processing is reduced and the effect of the present invention becomes remarkable. As the pitch is made smaller, however, the amount of data to be processed increases and the processing time becomes long. Therefore, it is desirable to set the pitch size considering the processing capability of the computer. According to an experiment, the construction processing can be executed favorably by setting a value of P/m≈1 to 10 [μm] as the pitch size.

Figure 5:
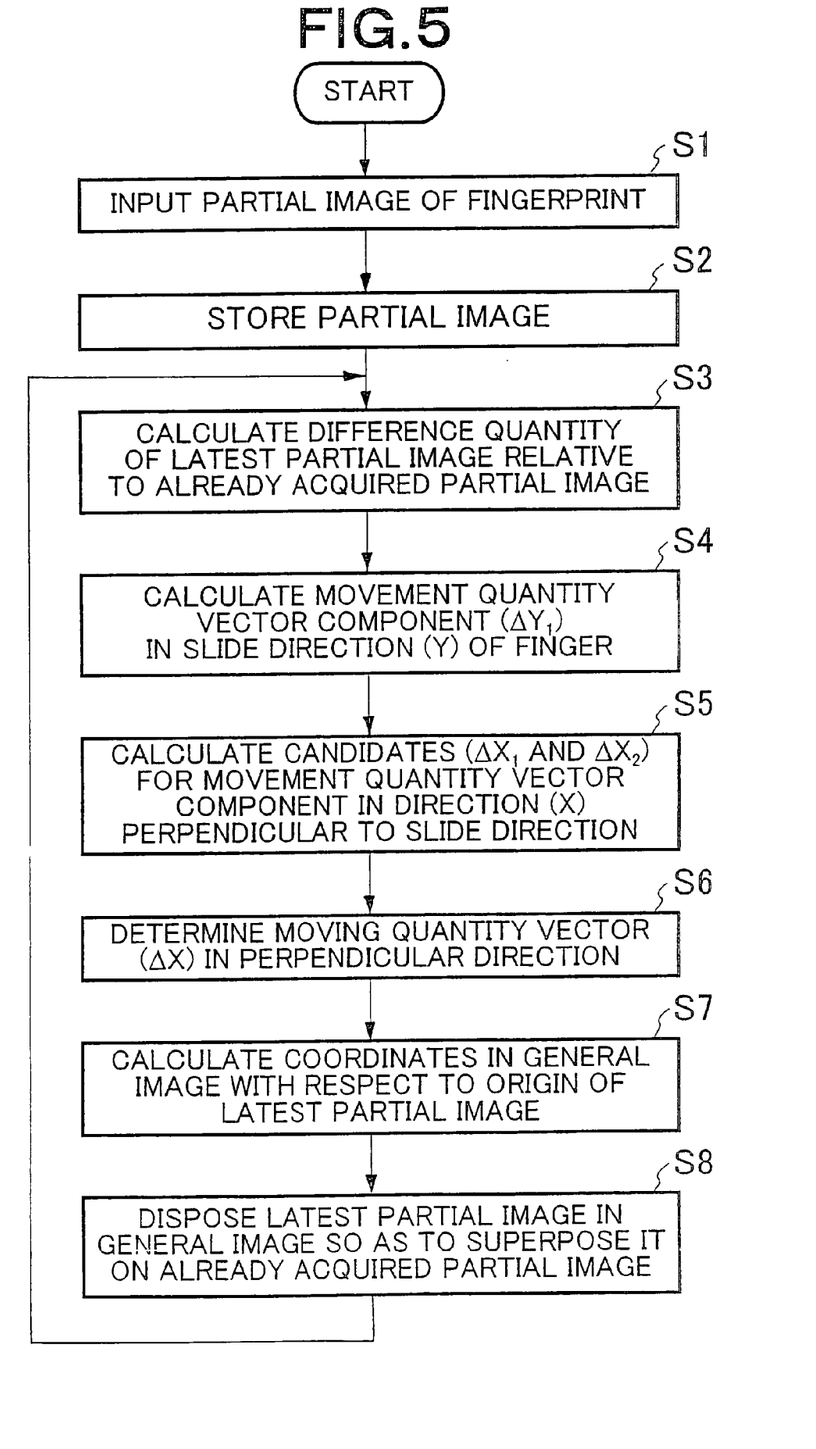
FIG. 5 is a flow chart showing an operation procedure according to an embodiment.

According to the method heretofore described, the first interpolation computation unit 121 calculates a moving quantity vector component $\Delta y_1$ in the y direction on the basis of the retrieval point S(i', j'), which is the displacement position at the time when the minimum image difference quantity D(i', j') is obtained, and the retrieval points A1(i', j'+1) and A2(i', j'−1) having the retrieval point S(i', j') between them in the y direction, and image difference quantities at the respective points (step S4 in FIG. 5). The first interpolation computation unit 121 outputs the calculated $\Delta y_1$ to the unification unit 123.

Secondly, the unification unit 123 calculates candidates $\Delta x_1$ and $\Delta x_2$ for the x direction component $\Delta x$ of the movement quantity vector on the basis of the two integer y coordinates having the vector component $\Delta y_1$ supplied from the first interpolation computation unit 121 between them. The x direction component $\Delta x$ corresponds to a second vector component in the present invention. The candidates $\Delta x_1$ and $\Delta x_2$ for it correspond to first and second candidates in the present invention. Supposing that the vector component $\Delta y_1$ in the y direction calculated by the first interpolation computation unit 121 is in a range "j'<$\Delta y_1$<j'+1," a procedure for calculating the candidates $\Delta x_1$ and $\Delta x_2$ for the vector component $\Delta x$ will now be described.

Figure 8:
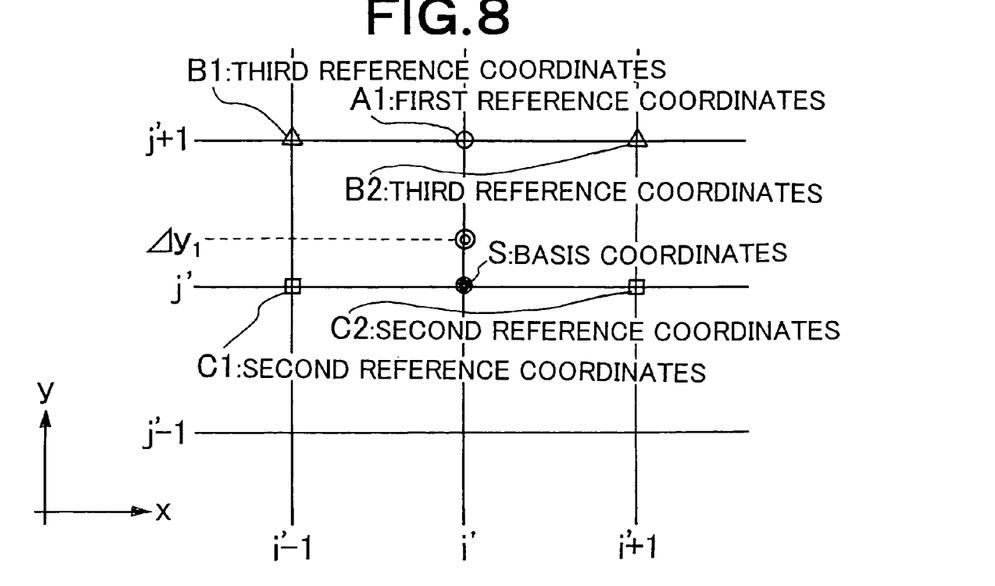
FIG. 8 is a diagram showing a calculation procedure of vector component candidates in an x direction in an embodiment.

FIG. 8 shows disposition of the vector component $\Delta y_1$ calculated by the first interpolation computation unit 121. As appreciated from FIG. 8, the two integer y coordinates having the $\Delta y_1$ between them indicate the y coordinate of the retrieval point S(i', j') serving as the basis coordinates and the y coordinate of the retrieval point A1(i', j'+1) serving as the first reference coordinates. From the coordinate range having these y coordinates, the candidates $\Delta x_1$ and $\Delta x_2$ for the vector component $\Delta x$ are found as values each having a resolution higher than the pixel pitch.

Specifically, in order to obtain the candidate $\Delta x_1$, the unification unit 123 outputs combinations of a retrieval point B1(i'−1, j'+1) and B2(i'+1, j'+1) adjacent to the retrieval point A1(i', j'+1) and difference quantities D at the retrieval points to the first interpolation computation unit 121. Each of the retrieval points B1 and B2 corresponds to third reference coordinates in the present invention. Furthermore, in order to obtain the candidate $\Delta x_2$, the unification unit 123 outputs combinations of a retrieval point C1(i'−1, j') and C2(i'+1, j') adjacent to the basis coordinates S(i', j') and difference quantities D at the retrieval points to the first interpolation computation unit 121. Each of the retrieval points C1 and C2 corresponds to second reference coordinates in the present invention.

Figure 7:
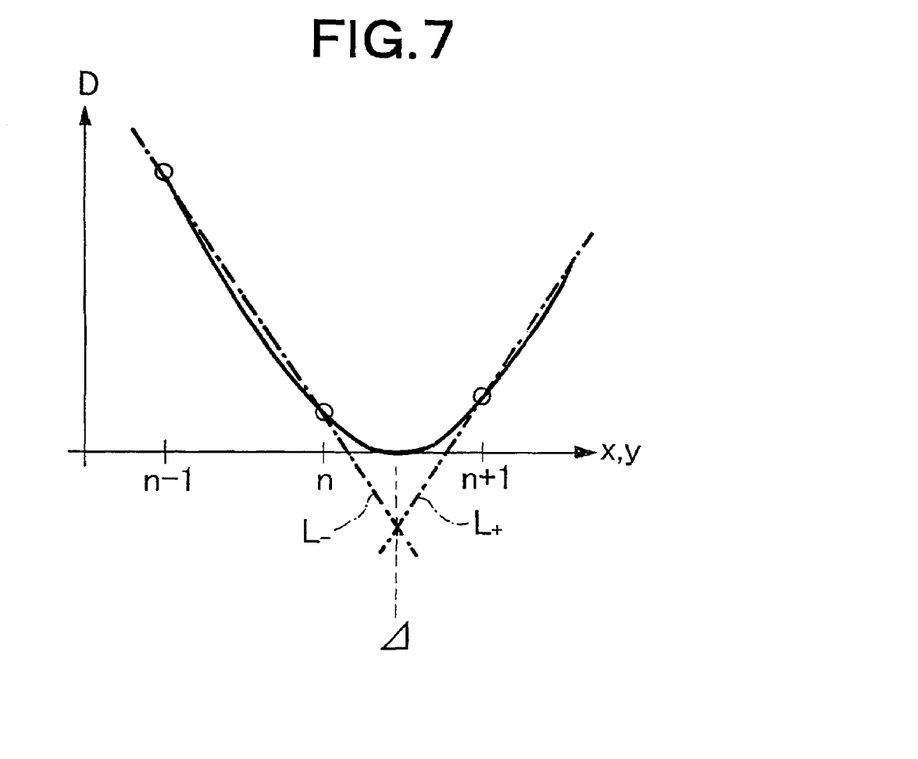
FIG. 7 is a diagram showing interpolation computation in an embodiment.

The first interpolation computation unit 121 conducts interpolation computation similar to the computation described with respect to the vector component $\Delta y_1$ with reference to FIG. 7, using the combinations of the retrieval points and the image difference quantities D output from the unification unit 123, and finds the candidates $\Delta x_1$ and $\Delta x_2$ for the vector component $\Delta x$ as values each having a resolution higher than the pixel pitch (step S5 in FIG. 5). And the first interpolation computation unit 121 returns the found result to the unification unit 123.

Thirdly, the unification unit 123 outputs the movement quantity vector component candidates $\Delta y_1$, $\Delta x_1$ and $\Delta x_2$ obtained according to the above-described procedure to the second interpolation computation unit 122. The second interpolation computation unit 122 determines a movement quantity vector ($\Delta x$, $\Delta y$) from these three coordinate values according to a procedure described hereafter.

Figure 9:
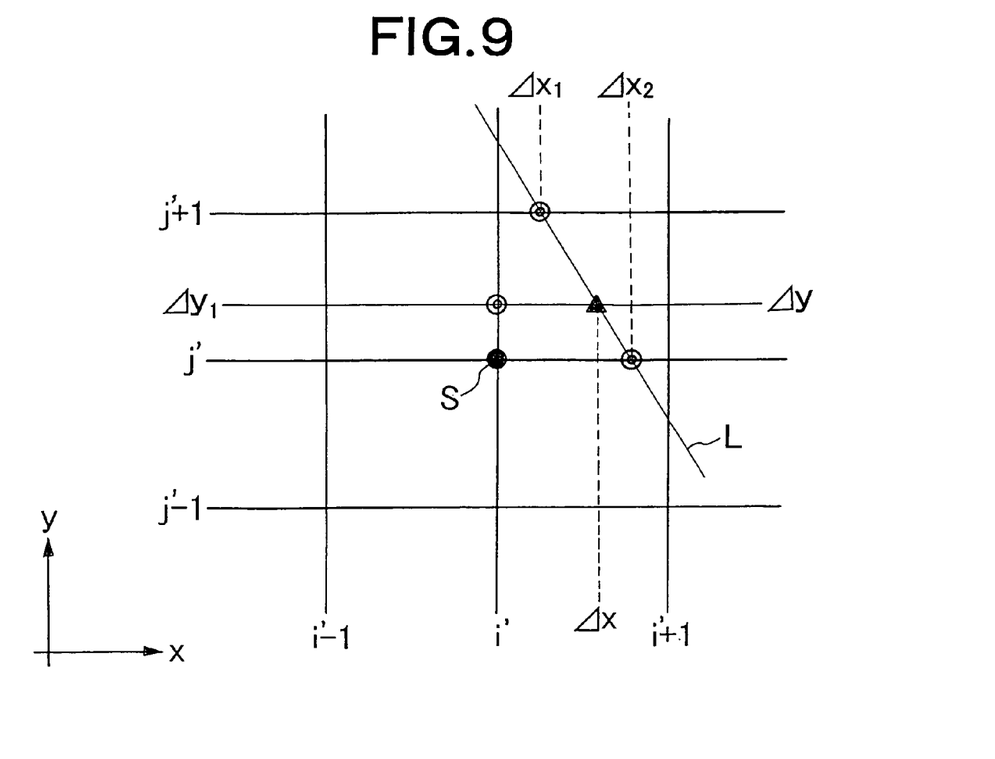
FIG. 9 is a diagram showing a determination procedure of a vector component candidate in an x direction in an embodiment.

FIG. 9 shows disposition of the vector component $\Delta y_1$ in the y direction and the candidates $\Delta x_1$ and $\Delta x_2$ for the vector component in the x direction. The second interpolation computation unit 122 first recognizes the vector component $\Delta y_1$ in the y direction as the vector component $\Delta y$ in the y direction to be found this time. Subsequently, the second interpolation computation unit 122 finds an x coordinate at an intersection of a straight line L passing through coordinate values ($\Delta x_1$, j'+1) and ($\Delta x_2$, j') respectively of the candidates $\Delta x_1$ and $\Delta x_2$ in the x direction and a straight line y=$\Delta y$, as the movement quantity vector component $\Delta x$ in the x direction (step S6 in FIG. 5). This $\Delta x$ is found by conducting weighted average computation on the candidates $\Delta x_1$ and $\Delta x_2$ on the basis of a fractional part of $\Delta y_1$, i.e., a value of a digit of $\Delta y_1$ that is less than the digit of the pixel pitch.

The second interpolation computation unit 122 outputs the movement quantity vector ($\Delta x$, $\Delta y$) determined according to the procedure heretofore described to the unification unit 123. The unification unit 123 outputs the supplied movement quantity vector ($\Delta x$, $\Delta y$) to the disposition coordinate computation unit 13.

The disposition coordinate computation unit 13 calculates disposition coordinates in the general image, of an origin of the latest partial image 31 to be disposed on the basis of the movement quantity vector ($\Delta x$, $\Delta y$) output from the movement quantity vector calculation unit 12 and coordinates of an origin of the already acquired partial image 32 in the general image (step S7 in FIG. 5). The coordinate values of the origin of the already acquired partial image 32 serving as the basis in the general image have been stored in the computation conducted the last time. Letting the coordinate values be ($X_0$, $Y_0$), coordinate values ($X_1$, $Y_1$) to be supplied in the general image to the origin of the latest partial image 31 can be obtained according to the following equation (3).

$$(X_1, Y_1) = (X_0 + \Delta x, Y_0 + \Delta y) \qquad (3)$$

The disposition coordinate computation unit 13 outputs the disposition coordinates ($X_1$, $Y_1$) obtained with respect to the latest partial image 31 to the image disposition unit 14, and stores the disposition coordinates ($X_1$, $Y_1$) in the disposition coordinate computation unit 13 in preparation for next computation.

The image disposition unit 14 disposes the latest partial image 31 so as to superpose it on the already acquired partial image 32 in the general image storage unit 20b on the basis of the disposition coordinates ($X_1$, $Y_1$) obtained by the disposition coordinate computation unit 13 (step S8 in FIG. 5). As for a method for disposing the latest partial image 31, for example, the following two methods are conceivable.

In one of the methods, coordinate values of each pixel of the latest partial image 31 in the general image are represented by integer values in the pixel pitch coordinate system. The coordinate values of each pixel of the latest partial image 31 can be obtained on the basis of the disposition coordinates ($X_1$, $Y_1$), which represent the origin of the image by using real numbers or integer values in the expanded coordinate system.

However, resultant coordinate values are real numbers or values in the expanded coordinate system.

In order to represent the values using integer values in the pixel pitch coordinate system, numerical values of digits less than the digit of the pixel pitch are discarded from the values. In this method, coordinate values (X, Y) assumed in the general image storage unit 20*b* by a pixel having coordinates (x, y) in the latest partial image 31 are calculated using the following equation (4).

$$(X, Y)=([X_1+x], [Y_1+y]) \qquad (4)$$

In the equation (4), brackets [ ]represents processing for discarding conducted to obtain integer values based on the pixel pitch coordinate system.

According to the discarding method, coordinates of each pixel in the latest partial image 31 are adjusted to become integer values in the pixel pitch coordinate system used in the general image storage unit 20*b*. Therefore, the disposition processing for the latest partial image 31 can be conducted smoothly. By the way, in this method, numerical values of digits less than the digit of the pixel pitch are discarded according to the equation (4) as described above. As appreciated from the equation (3), however, the disposition coordinates $(X_1, Y_1)$ used in the equation (4) have values based on the disposition coordinates $(X_0, Y_0)$ of the last time stored in the disposition coordinate computation unit 13, i.e., coordinate values before the discarding processing. Even if the discarding processing for obtaining integer values is conducted according to the equation (4), therefore, the result of the interpolation computation conducted by the movement quantity vector calculation unit 12 is reflected into the resultant disposition coordinates (X, Y).

In the other disposition method replacing the above-described method, pixel data that each pixel in the latest partial image 31 has are subjected to predetermined weighting and distributed to pixels of the already acquired partial image 32 in the general image storage unit 20*b*. As for weighting coefficients used in this case, numerical values discarded according to the equation (4) can be used.

The disposition method for the latest partial image 31 using the weighting will now be described with reference to FIG. 10. In the example shown in FIG. 10, one pixel 31*a* in the latest partial image 31 is virtually superposed on two pixels $P_L$ and $P_R$ included in the general image and represented by dotted lines, on the basis of the result of the computation conducted by the disposition coordinate computation unit 13. In the illustrated example, the pixel 31*a* is aligned with the pixels $P_L$ and $P_R$ in the y direction. In the x direction, however, the pixel 31*a* is deviated from the pixels $P_L$ and $P_R$ by a displacement quantity $\alpha$ (where $\alpha<1$) less than the pixel pitch. The numerical values discarded by the disposition method according to the equation (4) correspond to the displacement quantity $\alpha$.

Figure 10:
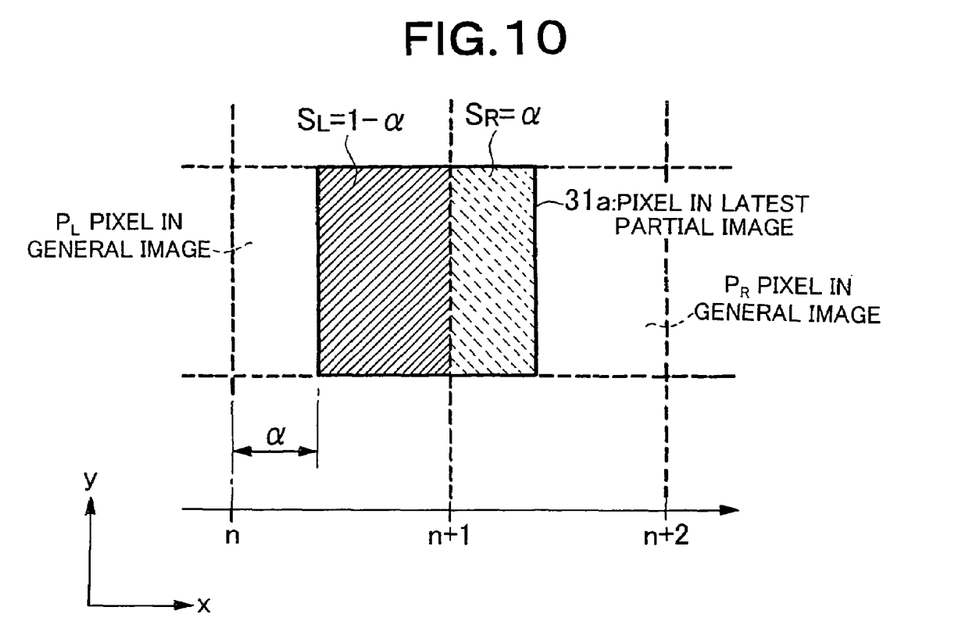
FIG. 10 is a diagram showing a disposition procedure of a latest partial image in an embodiment.

Denoting pixel data that the pixel 31*a* in the latest partial image 31 has in the state shown in FIG. 10 by I, and pixel data obtained by distributing the pixel data I to the pixels $P_L$ and $P_R$ in the general image by $I_L$ and $I_R$, the pixel data $I_L$ and $I_R$ can be represented by the following equation (5).

$$I_L=L\times I, I_R=R\times I(L+R=1) \qquad (5)$$

L and R in the equation (5) are weighting coefficients which prescribe the distribution ratio of the image data I.

From FIG. 10, areas SL and SR of regions in which the pixel 31*a* in the latest partial image 31 overlaps the pixels $P_L$ and $P_R$ in the general image are represented by the following equation (6).

$$S_L=1-\alpha, S_R=\alpha(S_L+S_R=1) \qquad (6)$$

The areas $S_L$ and $S_R$ obtained using the equation (6) represent distribution quantities of the pixel 31*a* to the pixels $P_L$ and $P_R$ in the general image. Therefore, pixel data of the pixel 31*a* to be distributed to the pixels $P_L$ and $P_R$ in the general image can be obtained by substituting the areas $S_L$ and $S_R$ into the equation (5) as weighting coefficients. In other words, the pixel data $I_L$ and $I_R$ can be obtained by the following equation (7).

$$I_L=S_L\times I=(1-\alpha)\times I, I_R=S_R\times I=\alpha\times I \qquad (7)$$

The pixel data $I_L$ and $I_R$ obtained by the above-describe method are stored in the pertinent pixel in the general image storage unit 20*b*. According to the disposition method using the weighting, therefore, the disposition coordinates (x, y) in the latest partial image 31 represented by numerical values each having a resolution higher than the pixel pitch can be reflected into the general image faithfully.

The above-described processing conducted in the difference computation unit 11 is repeated until the fingerprint reading conducted by the sweep type fingerprint sensor 10 is finished.

According to the fingerprint image construction apparatus 100 heretofore described, partial image construction processing is conducted on the basis of the true movement quantity of the latest partial image 31 relative to the already acquired partial image 32, which is obtained using the interpolation computation by the movement quantity vector calculation unit 12. Therefore, it is possible to make it hard for distortion to occur in the general image after the construction processing, irrespective of the resolution that the sweep type fingerprint sensor 10 has. As a result, it becomes possible to properly execute the authentication processing using the fingerprint.

The operation procedure in the control mechanism 30 corresponds to steps in a program executed by the computer. By introducing the program corresponding to the procedure into an information processing device such as a personal computer or a personal digital assistant having the sweep type fingerprint sensor 10, therefore, the device can be utilized as a fingerprint image construction apparatus according to the present invention.

What is claimed is:

1. An image construction method used in an apparatus including a sensor mechanism to read a series of partial images representing a fingerprint from a finger which conducts a slide operation, the image construction method comprising the steps of:

a computer (FIG. 3 30) performing the steps of;
   successively storing partial images read by the sensor mechanism, causing a displacement of a latest partial image in the successively stored partial images relative to an already acquired partial image with a pixel pitch of the sensor mechanism, and obtaining a difference quantity between the latest partial image and the already acquired partial image every displacement;
   conducting interpolation computation based on basis coordinates corresponding to a minimum difference quantity among the obtained difference quantities, first reference coordinates adjacent to the basis coordinates in a slide direction of a finger, and difference quantities obtained at the first reference coordinates and the basis coordinates, and thereby obtaining a first vector component indicating a movement quantity of the latest partial image in the slide direction as a value having a resolution higher than the pixel pitch;
   conducting interpolation computation based on the basis coordinates, second reference coordinates adjacent to the basis coordinates in a direction perpendicular to the slide direction, and difference quantities obtained at the second reference coordinates and the basis coordinates, and thereby obtaining a first candidate for a second vector component indicating a movement quantity of the latest partial image in the perpendicular direction as a value having a resolution higher than the pixel pitch;

conducting interpolation computation based on the first reference coordinates, and third reference coordinates adjacent to the first reference coordinates in the perpendicular direction, and difference quantities obtained at the third reference coordinates and the first reference coordinates, and thereby obtaining a second candidate for the second vector component as a value having a resolution higher than the pixel pitch;

conducting weighted average computation based on the first vector component on the first and second candidates for the second vector component, and thereby determining the second vector component; and disposing the latest partial image relative to the already acquired partial image on the basis of a movement quantity vector including the first and second vector components.

2. The image construction method according to claim 1, wherein in the interpolation computations the apparatus obtains the first vector component, and the first and second candidates for the second vector component as real number values.

3. The image construction method according to claim 1, wherein in the interpolation computations the apparatus obtains the first vector component, and the first and second candidates for the second vector component as integer values based on a coordinate system having a pitch that is integer times the pixel pitch.

4. The image construction method according to claim 1, wherein when disposing the latest partial image on the basis of the movement quantity vector, the apparatus discards numerical values, in the movement quantity vector, of digits less than a digit of the pixel pitch, and disposes the latest partial image by using the movement quantity vector obtained by the discarding.

5. The image construction method according to claim 1, wherein when disposing the latest partial image on the basis of the movement quantity vector, the apparatus distributes pixel data of a pixel in the latest partial image overlapping a plurality of pixels in the already acquired partial image, by using weighting coefficients based on numerical values, in the movement quantity vector, of digits less than a minimum digit of the pixel pitch.

6. A fingerprint image construction apparatus including a sensor mechanism for reading a series of partial images representing a fingerprint from a finger which conducts a slide operation, a memory mechanism for successively storing the series of partial images read by the sensor mechanism, and a control mechanism for conducting construction processing on the series of partial images stored by the memory mechanism, wherein the control mechanism comprises:

a difference computation unit for causing a displacement of a latest partial image in the partial images successively stored by the memory mechanism relative to an already acquired partial image with a pixel pitch of the sensor mechanism, and obtaining a difference quantity between the latest partial image and the already acquired partial image every displacement;

a movement quantity vector calculation unit for conducting interpolation computation based on basis coordinates corresponding to a minimum difference quantity among difference quantities obtained by the difference computation unit, first reference coordinates adjacent to the basis coordinates in a slide direction of a finger, and difference quantities obtained at the first reference coordinates and the basis coordinates, and thereby obtaining a first vector component indicating a movement quantity of the latest partial image in the slide direction as a value having a resolution higher than the pixel pitch, conducting interpolation computation based on the basis coordinates, second reference coordinates adjacent to the basis coordinates in a direction perpendicular to the slide direction, and difference quantities obtained at the second reference coordinates and the basis coordinates, and thereby obtaining a first candidate for a second vector component indicating a movement quantity of the latest partial image in the perpendicular direction as a value having a resolution higher than the pixel pitch, conducting interpolation computation based on the first reference coordinates, and third reference coordinates adjacent to the first reference coordinates in the perpendicular direction, and difference quantities obtained at the third reference coordinates and the first reference coordinates, and thereby obtaining a second candidate for the second vector component as a value having a resolution higher than the pixel pitch, conducting weighted average computation based on the first vector component on the first and second candidates for the second vector component, and thereby determining the second vector component;

a disposition coordinate computation unit for obtaining disposition coordinates of the latest partial image relative to the already acquired partial image on the basis of a movement quantity vector including the first and second vector components; and an image disposition unit for disposing the latest partial image in the memory mechanism on the basis of the disposition coordinates.

7. The fingerprint image construction apparatus according to claim 6, wherein in the interpolation computations the movement quantity vector calculation unit obtains the first vector component, and the first and second candidates for the second vector component as real number values.

8. The fingerprint image construction apparatus according to claim 6, wherein in the interpolation computations the movement quantity vector calculation unit obtains the first vector component, and the first and second candidates for the second vector component as integer values based on a coordinate system having a pitch that is integer times the pixel pitch.

9. The fingerprint image construction apparatus according to claim 6, wherein the disposition coordinate computation unit discards numerical values, in the movement quantity vector, of digits less than a digit of the pixel pitch, and disposes the latest partial image by using the movement quantity vector obtained by the discarding.

10. The fingerprint image construction apparatus according to claim 6, wherein when disposing the latest partial image on the basis of the movement quantity vector, the disposition coordinate computation unit distributes pixel data of a pixel in the latest partial image overlapping a plurality of pixels in the already acquired partial image, by using weighting coefficients based on numerical values, in the movement quantity vector, of digits less than a minimum digit of the pixel pitch.

11. A computer program product embodied on a computer-readable medium and comprising codes that, when executed, cause a computer connected to a sensor mechanism for reading a series of partial images representing a fingerprint from a finger which conducts a slide operation to perform the steps of:

successively storing partial images read by the sensor mechanism, causing a displacement of a latest partial image in the successively stored partial images relative to an already acquired partial image with a pixel pitch of the sensor mechanism, and obtaining a difference quantity between the latest partial image and the already acquired partial image every displacement;

conducting interpolation computation based on basis coordinates corresponding to a minimum difference quantity among the obtained difference quantities, first reference coordinates adjacent to the basis coordinates in a slide direction of a finger, and difference quantities obtained at the first reference coordinates and the basis coordinates, and thereby obtaining a first vector component indicating a movement quantity of the latest partial image in the slide direction as a value having a resolution higher than the pixel pitch;

conducting interpolation computation based on the basis coordinates, second reference coordinates adjacent to the basis coordinates in a direction perpendicular to the slide direction, and difference quantities obtained at the second reference coordinates and the basis coordinates, and thereby obtaining a first candidate for a second vector component indicating a movement quantity of the latest partial image in the perpendicular direction as a value having a resolution higher than the pixel pitch;

conducting interpolation computation based on the first reference coordinates, and third reference coordinates adjacent to the first reference coordinates in the perpendicular direction, and difference quantities obtained at the third reference coordinates and the first reference coordinates, and thereby obtaining a second candidate for the second vector component as a value having a resolution higher than the pixel pitch;

conducting weighted average computation based on the first vector component on the first and second candidates for the second vector component, and thereby determining the second vector component; and disposing the latest partial image relative to the already acquired partial image on the basis of a movement quantity vector including the first and second vector components.

12. The program product according to claim 11, wherein in the interpolation computations the computer is caused to obtain the first vector component, and the first and second candidates for the second vector component as real number values.

13. The program product according to claim 11, wherein in the interpolation computations the computer is caused to obtain the first vector component, and the first and second candidates for the second vector component as integer values based on a coordinate system having a pitch that is integer times the pixel pitch.

14. The program product according to claim 11, wherein when disposing the latest partial image on the basis of the movement quantity vector, the computer is caused to distribute pixel data of a pixel in the latest partial image overlapping a plurality of pixels in the already acquired partial image, by using weighting coefficients based on numerical values, in the movement quantity vector, of digits less than a minimum digit of the pixel pitch.

15. The program product according to claim 11, wherein when disposing the latest partial image on the basis of the movement quantity vector, the computer is caused to distribute pixel data of each pixel in the latest partial image to pixels that overlap the pixel in the latest partial image and that are included in the already acquired partial image by conducting weighting corresponding to numerical values, in the movement quantity vector, of digits less than a minimum digit of the pixel pitch, and dispose the latest partial image on the basis of the distribution.

* * * * *